(12) United States Patent
Kuo et al.

(10) Patent No.: US 7,735,322 B2
(45) Date of Patent: Jun. 15, 2010

(54) WAVE ELIMINATION SYSTEM FOR OCEAN THERMAL ENERGY CONVERSION ASSEMBLY

(76) Inventors: Fang Sheng Kuo, No. 59-17, Hengkeng Lane, Beitun District, Taichung City 406 (TW); Po Hsuan Kuo, No. 59-17, Hengkeng Lane, Beitun District, Taichung City 406 (TW); Chung Hsuan Kuo, No. 59-17, Hengkeng Lane, Beitun District, Taichung City 406 (TW)

(*) Notice: Subject to any disclaimer, the term of this patent is extended or adjusted under 35 U.S.C. 154(b) by 215 days.

(21) Appl. No.: 12/134,812

(22) Filed: Jun. 6, 2008

(65) Prior Publication Data

US 2009/0301088 A1    Dec. 10, 2009

(51) Int. Cl.
F03G 7/04    (2006.01)
(52) U.S. Cl. .................................................. 60/641.7
(58) Field of Classification Search ............... 60/641.6, 60/641.7
See application file for complete search history.

(56) References Cited

U.S. PATENT DOCUMENTS

| | | | | |
|---|---|---|---|---|
| 3,805,515 A | * | 4/1974 | Zener | 60/641.7 |
| 4,210,820 A | * | 7/1980 | Wittig | 290/52 |
| 4,245,475 A | * | 1/1981 | Girden | 60/641.7 |
| 4,476,249 A | * | 10/1984 | Avery | 518/703 |
| 4,497,342 A | | 2/1985 | Wenzel et al. | 137/565.17 |
| 4,781,029 A | * | 11/1988 | SerVaas | 60/641.7 |

OTHER PUBLICATIONS

L.A. Vega, Ph.D., Hawaii, USA, Ocean Thermal Energy Coversion (OTEC), Dec. 1999, "Design of a Pre-Commercial Floating Hybrid-OTEC Plant".
Phil Kopiske, Feb. 4, 2002, "Sea Solar Power 100 MW Hybrid Cycle OTEC Plantship Design".

* cited by examiner

*Primary Examiner*—Hoang M Nguyen
(74) *Attorney, Agent, or Firm*—Wang Law Firm, Inc.; Li K. Wang

(57) ABSTRACT

An ocean thermal energy conversion assembly includes a ship having support tubes connected between a lower part and a top deck of the ship so as to define an open space. A passage is defined through the lower part and an annular connector is connected to a lower end of the passage. A plurality of rods extend from a top of the annular connector and are pivotably connected to the annular connection portion. A transmission pipe is connected to an underside of the annular connector. A hollow damper is connected to an outer periphery of the annular connector and an outer periphery of the hollow damper is engaged with an inner periphery of a bottom opening in a lower end of the passage. A top cover seals a top opening of the passage and has a wave-elimination way which communicates with holes in the top cover.

8 Claims, 8 Drawing Sheets

WAVE ELIMINATION SYSTEM FOR OCEAN THERMAL ENERGY CONVERSION ASSEMBLY

FIELD OF THE INVENTION

The present invention relates to a wave elimination system for reducing impact to the connection between pipes and ocean thermal energy conversion assembly.

BACKGROUND OF THE INVENTION

An ocean thermal energy conversion system employs the difference of temperature of sea water to generate electric power. Generally speaking, the temperature of the sea water at the deeper is lower than that close to the surface and the difference can be 20° C. It requires a significant amount of sea water to generate business scale of electric power, a huge pipe and ship are basic for establishing an ocean thermal energy conversion assembly. However, the connection between the ship and the pipes have to be secure enough to bear the force applied thereto from the waves. Generally, the pipes are fixed to the ship by a hard way which means there is limited flexibility of the connection so that when the waves hit the ship and the pipes, or the sea streams apply a force to the connection, the pipes are easily damaged and the connection can be easily broken. Once there is a leakage at the connection, the pipes are dragged and separated from the ship.

The present invention intends to provide a wave elimination system for reducing impact to the connection between pipes and ocean thermal energy conversion assembly, the ship used in the system includes an open space defined between the deck and the lower part of the ship, the sea level is on the half height of the open space so that the waves cannot apply too much force to the ship such that the impact from the waves is reduced.

SUMMARY OF THE INVENTION

The present invention relates to an ocean thermal energy conversion assembly which comprises a ship having a lower part and a top deck, between which an open space is defined and a plurality of support tubes are connected between the lower part and the top deck. A plurality of chambers are defined in the lower part. At least one passage is defined through the lower part and an annular connection portion is connected to a top of the passage. An outlet pipe is connected an inside of the at least one passage. An annular connector is located at a lower end of the at least one passage and a plurality of rods extend from a top of the annular connector. The rods are pivotably connected to the annular connection portion. A transmission pipe is connected to an underside of the annular connector. A hollow damper is connected to an outer periphery of the annular connector and liquid is received in the hollow damper. An outer periphery of the hollow damper is engaged with an inner periphery of a bottom opening defined in a lower end of the passage. A top cover is engaged with and seals a top opening of the passage. A wave-elimination way is defined in an inside of the top cover and has a first end communicating with an outlet pipe on an outside of the passage. The wave-elimination way communicates with a plurality of holes defined in the top cover and the holes communicate with the wave-elimination way.

The primary object of the present invention is to provide a wave elimination system for reducing impact to the connection between pipes and ocean thermal energy conversion assembly.

Another object of the present invention is to provide a wave elimination system for an ocean thermal energy conversion assembly, the system reduces the area that the waves may apply force thereto so as to increase stability of the ship on the sea.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
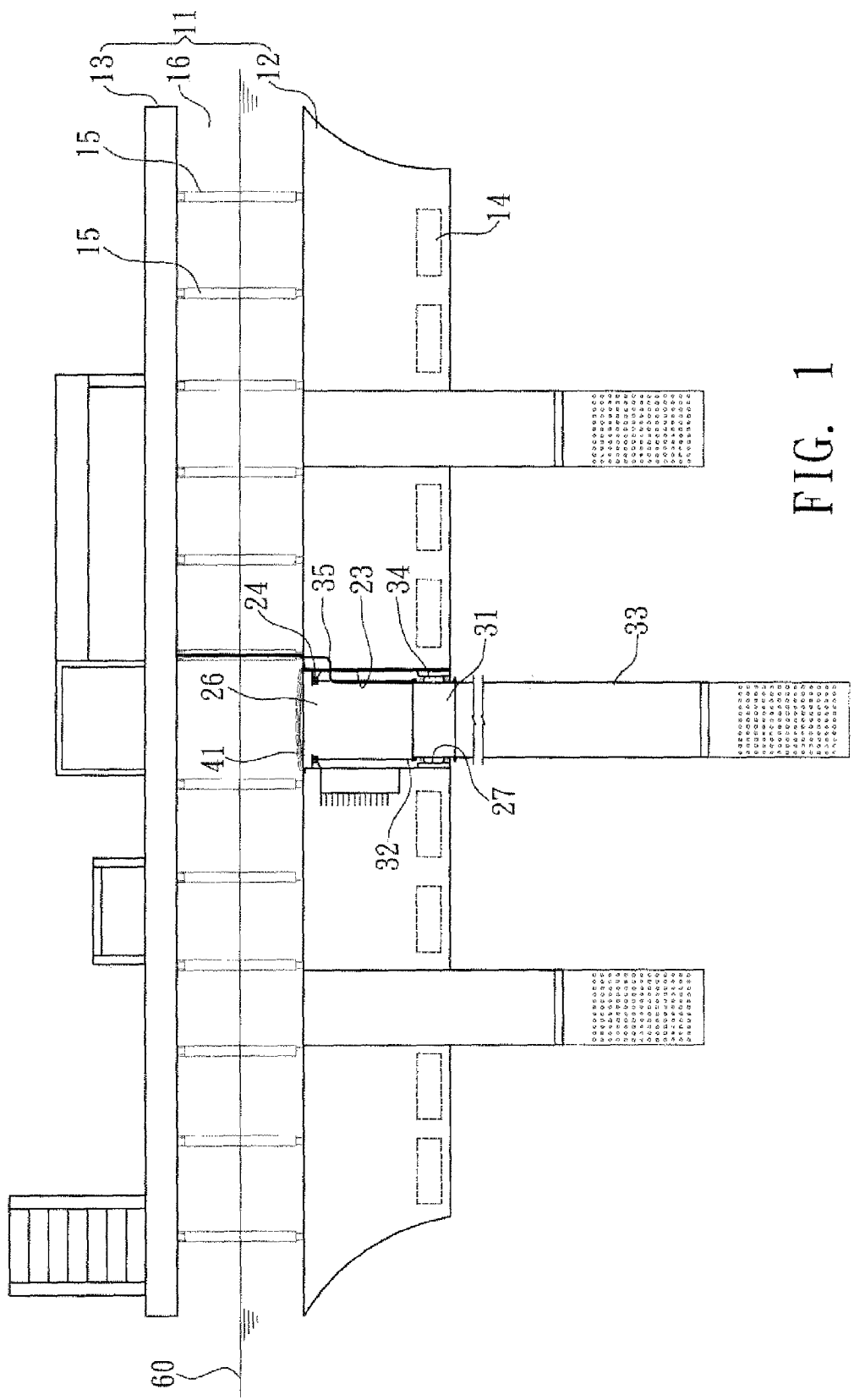
FIG. 1 shows the wave elimination system for reducing ocean thermal energy conversion assembly of the present invention.

Referring to FIG. 1, the wave elimination system for an ocean thermal energy conversion assembly of the present invention comprises a ship 11, an annular connector 31 and a top cover 41. The ship 11 has a lower part 12 and a top deck 13. A plurality of chambers 14 are defined in the lower part 12 so as to be filled with water to increase the weight of the ship 11 such that the sea level will raise relative to the ship 11, or to release water from the chambers 14 to float the ship 11 at higher position.

Figure 2:
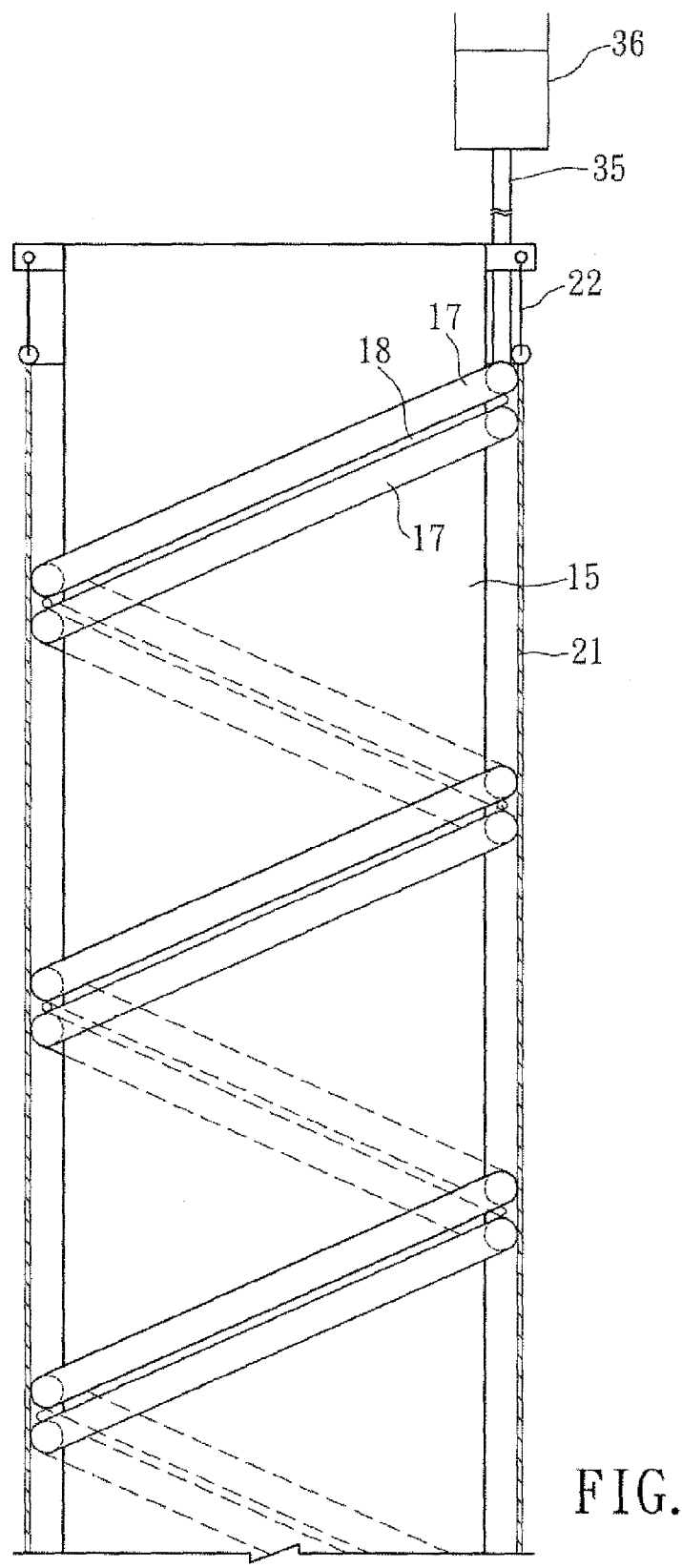
FIG. 2 shows the support tube of the wave elimination system of the present invention.
Figure 3:
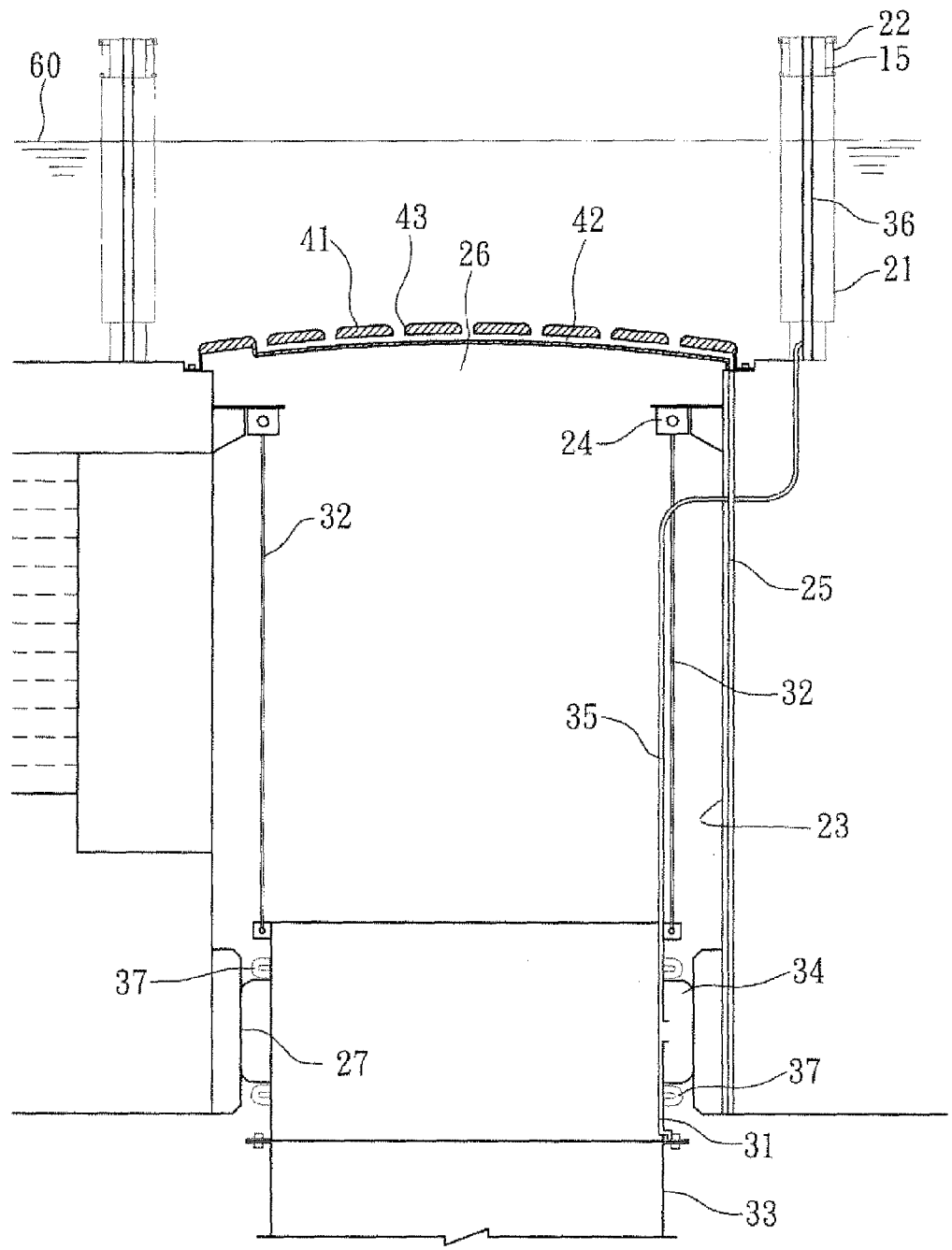
FIG. 3 is a partial cross sectional view to show the wave elimination system of the present invention.

A plurality of support tubes 15 are connected between the lower part 12 and the top deck 13 so as to define an open space 16. As shown in FIG. 2, a plurality of rubber tubes 17 spirally warp around each of the support tubes 15 an a plurality of sock absorbing members 18 are located between the rubber tubes 17. Each of the rubber tubes 17 are connected with a pressure pipe 35 which is connected with a pressure tower so that each rubber tube 17 can be filled with a pressurized liquid. A diameter of each shock absorbing members 18 is smaller than a diameter of each of the rubber tubes 17. A steel tube 21 is mounted to each of the support tube 15 and hanged by steel cables 22. An inner periphery of the steel tube 21 is in contact with the rubber tubes 17. As shown in FIG. 3, at least one passage 23 is defined through the lower part 12 and an annular connection portion 24 is connected to a top of the passage 23. An outlet pipe 25 is connected an inside of the at least one passage 23. The outlet pipe 25 communicates with the top opening 26 and a bottom of the ship 11.

Figure 4:
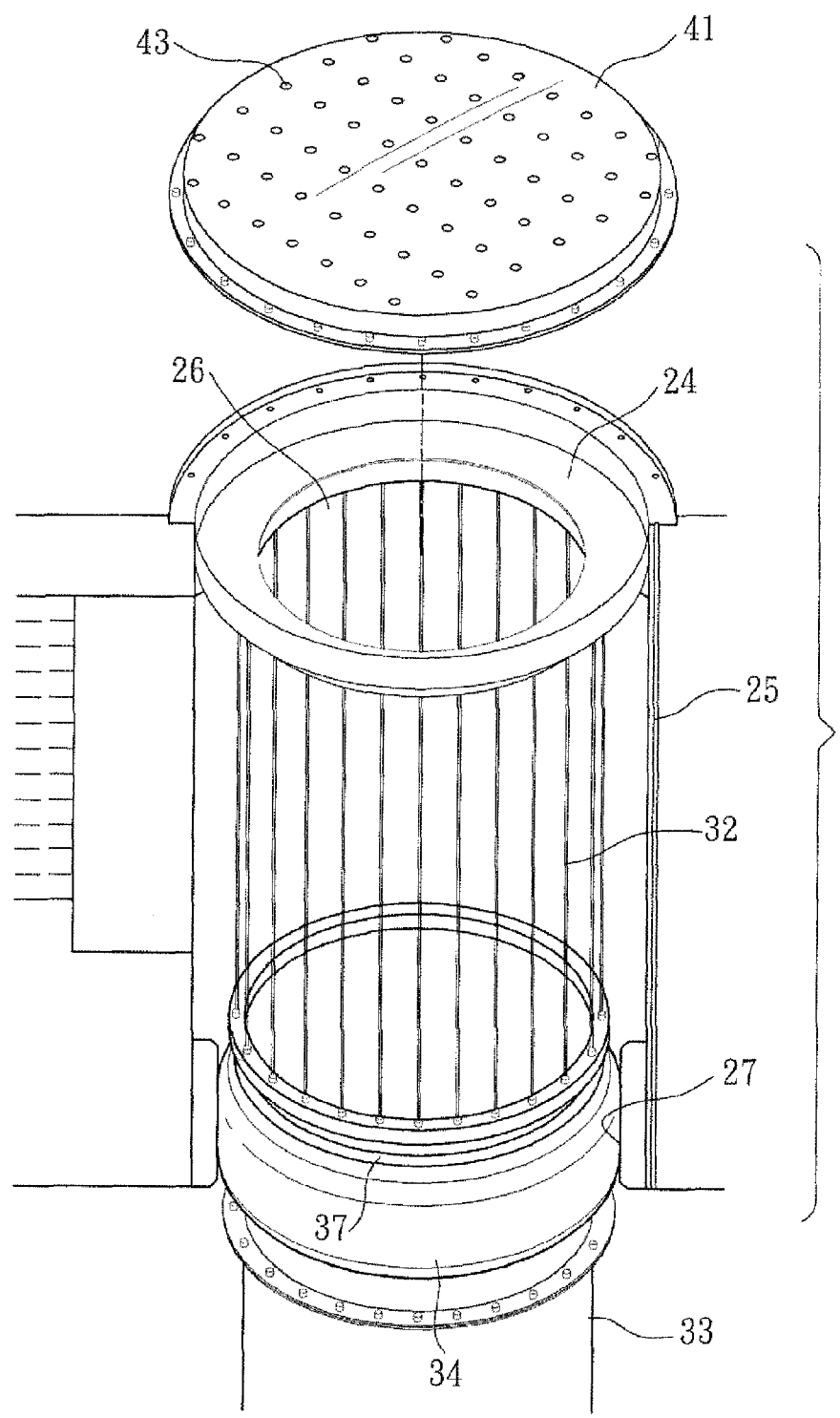
FIG. 4 shows the passage and the annular connector of the wave elimination system of the present invention.

As shown in FIG. 4, an annular connector 31 is located at a lower end of the at least one passage 23 and a plurality of rods 32 extend from a top of the annular connector 31. The rods 32 are pivotably connected to the annular connection portion 24. A transmission pipe 33 is connected to an underside of the annular connector 31. A hollow damper 34 is connected to an outer periphery of the annular connector 31 and liquid is received in the hollow damper 34. The pressure pipe 35 has one end connected with the hollow damper 34 and the other end of the pressure pipe 35 is connected to the pressure tower 36. The liquid is pressurized and filled with the hollow damper 34 which expand outward. An outer periphery of the hollow damper 34 engaged with an inner periphery of a bottom opening 27 defined in a lower end of the passage 23. Two shock absorbing collars 37 are located on two ends of the hollow damper 34 and an diameter of each shock absorbing collar 37 is smaller than a diameter of the hollow damper 34.

The top cover 41 is engaged with and sealing a top opening 26 of the passage 23. A wave-elimination way 42 is defined in an inside of the top cover 41 and has a first end communicating with an outlet pipe 25 on an outside of the passage 23. The wave-elimination way 42 communicates with a plurality of holes 43 defined in the top cover 41 and the holes 43 communicate with the wave-elimination way 42. One end of the outlet pipe 25 is in communication with the holes 43 via the wave-elimination passage 42.

Figure 5:
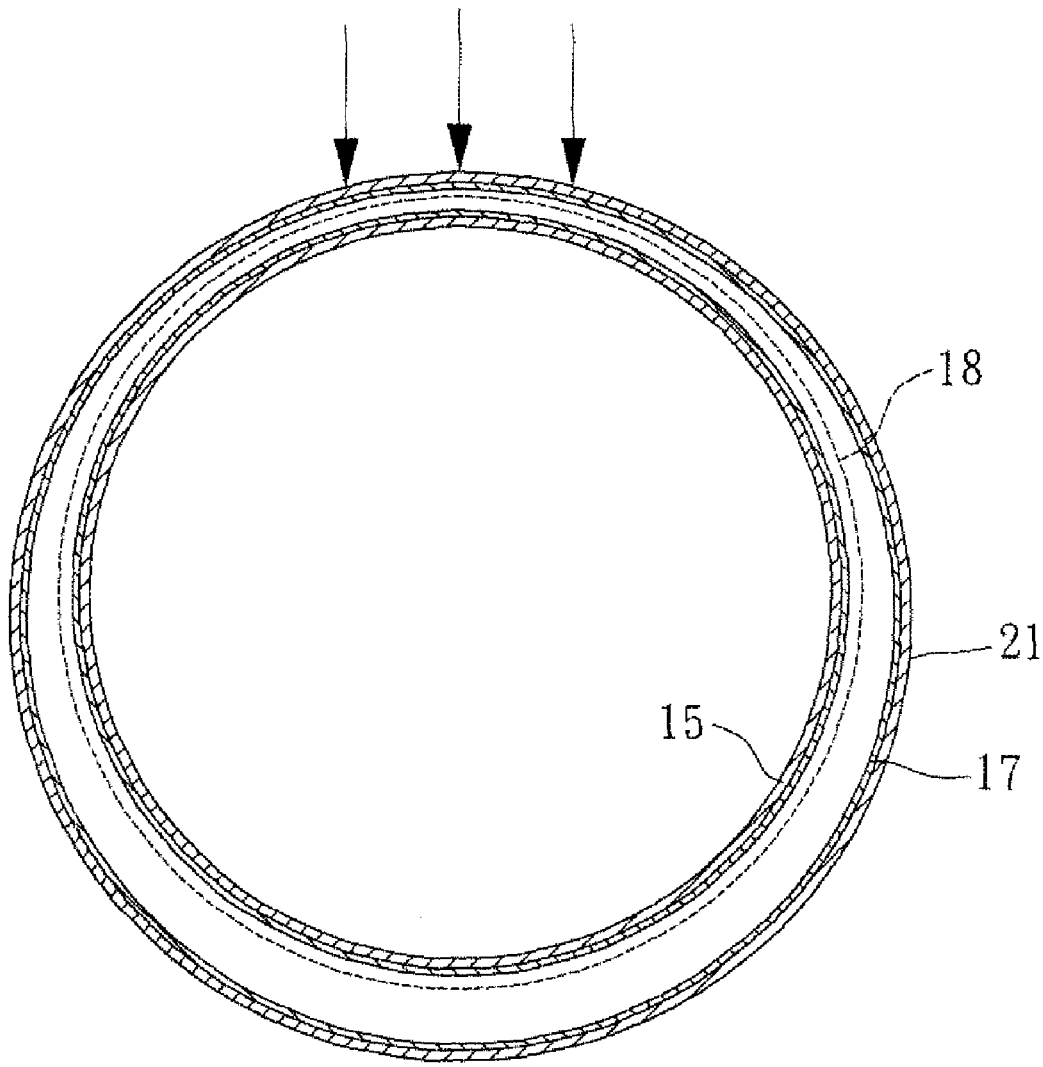
FIG. 5 shows the that the support pipe is applied a force.

When the ship 11 arrives a desired position on the sea, the ship 11 merges into the water by filling water into the chambers 14 until a sea level 60 is located on a half height of the support tubes 15 in the space 16. Because only support tubes 15 are located in the open space 16 so that waves cannot apply a significant force to the ship 11 and the ship 11 can be located at position in a stable status. When a large wave hits the support tubes 15, as shown in FIG. 5, the rubber tubes 17 are applied by a force and the liquid in the support tubes 15 is squeezed by the steel tubes 21 and move to a side so as to absorb the force that affects the ship 11. The inner periphery of the steel tubes 21 is stopped by the shock absorbing members 18 so as to avoid the steel tubes 21 from hitting the support tubes 15 directly.

Figure 6:
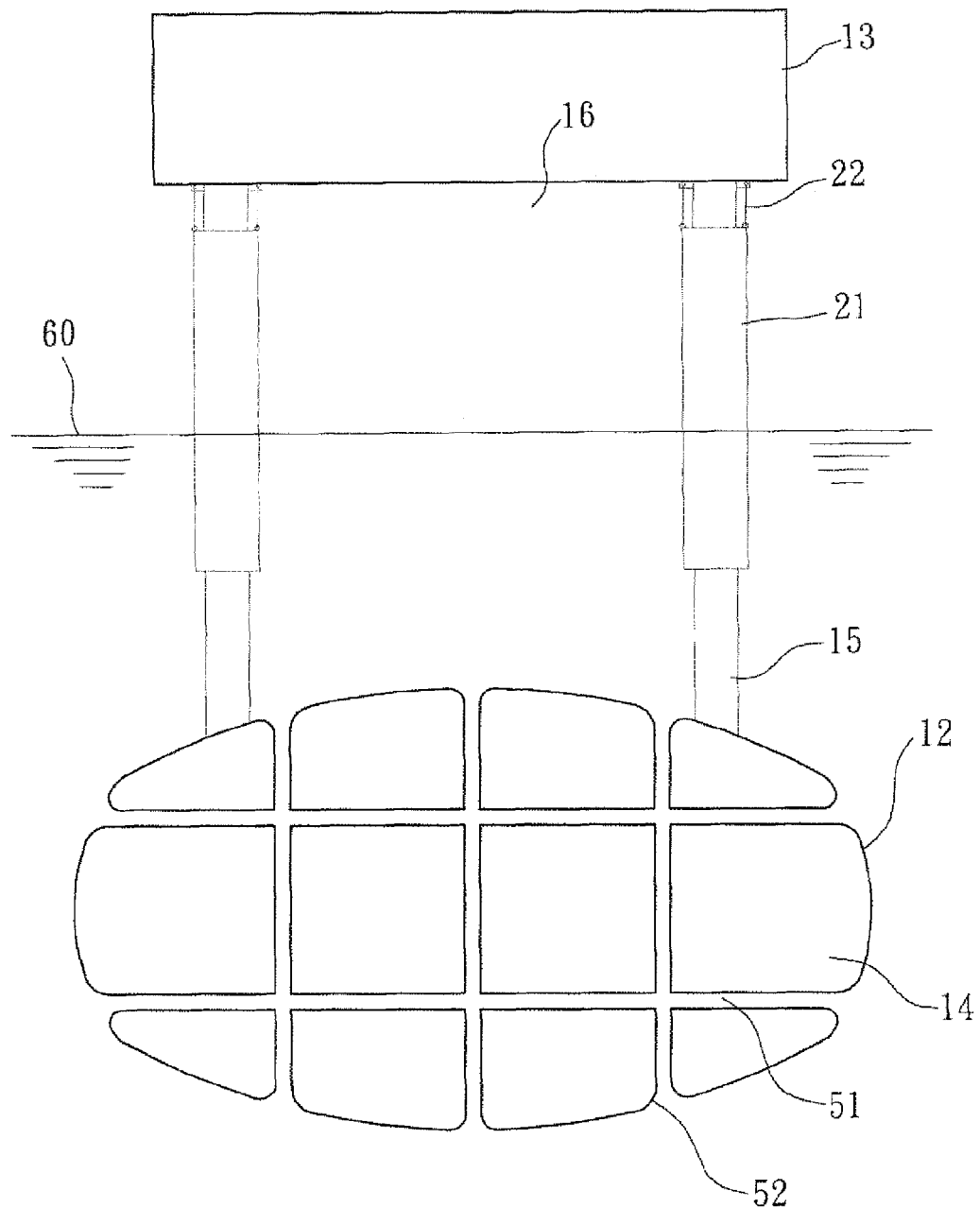
FIG. 6 shows the lower part of the ship of the ocean thermal energy conversion assembly.

As shown in FIG. 6, the ship 11 includes honey-comb shaped flow ways 51 defined in the lower part 12 thereof and openings 52 are defined in communication between the honeycomb shaped flow ways and outside of the lower part 12 of the ship 11. The openings 52 dispense the force for a sudden huge wave hitting the ship 11.

Figure 7:
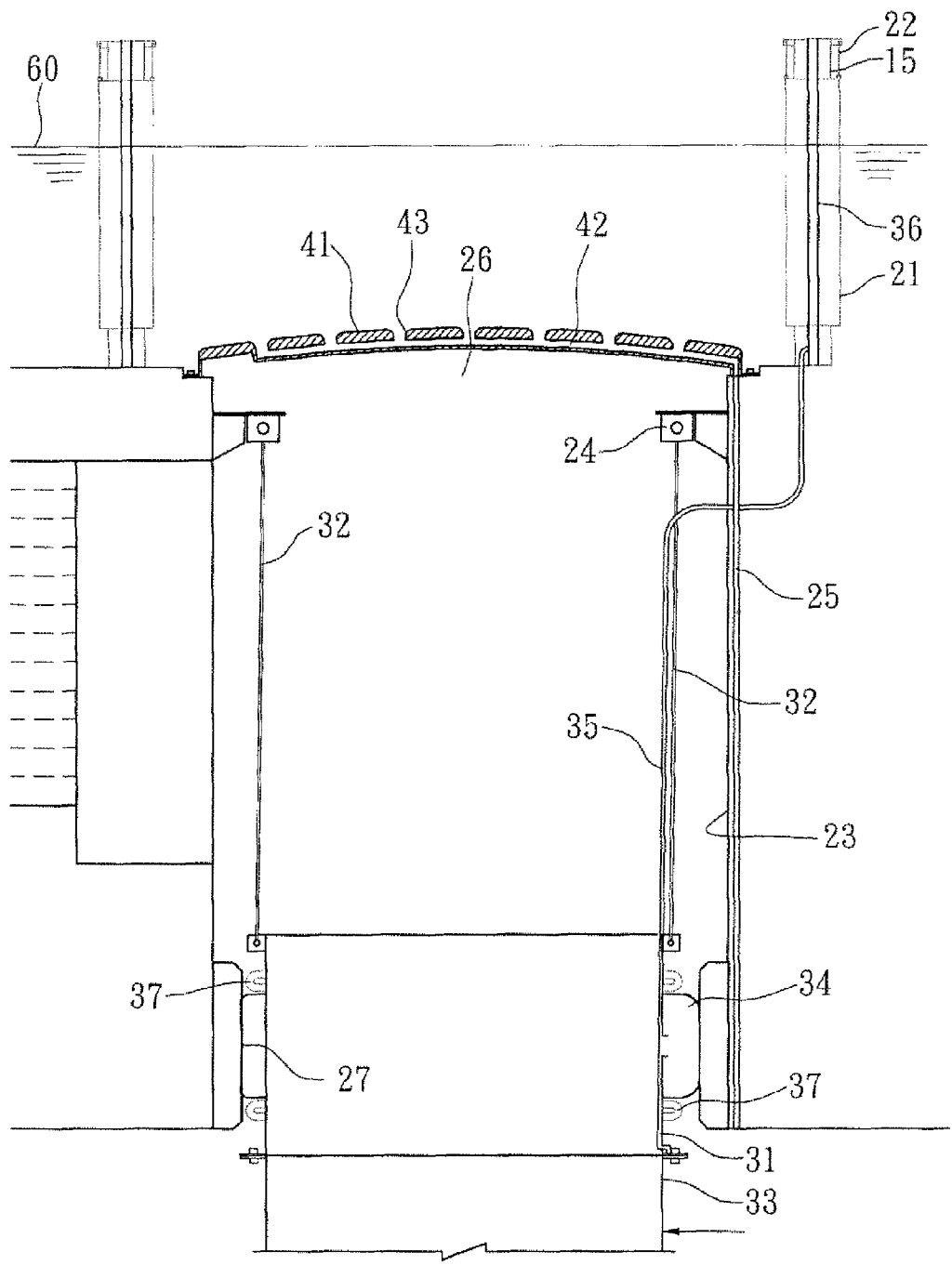
FIG. 7 shows the stream of the sea applies a force to the transmission pipe which is pivoted and squeezes the hollow damper.

The annular connector 31 is connected to the passage 23 by the pivotable rods 32 so that the annular connector 31 can be moved within the passage 23. When the transmission pipe 33 swings due to the action from the sea stream, as shown in FIG. 7, the hollow damper 34 has one side squeezed and the other side swells so as to ensure the sealing between the hollow damper 34 and the bottom opening 27 of the passage 23. When the pressure on the transmission pipe 33 is larger than that the annular connector 31 can bear, the annular connector 31 is stopped by the two shock absorbing collars 37. By this way, the two shock absorbing collars 37 and the hollow damper 34 shares the pressure on the transmission pipe 33.

As shown in FIG. 3, the top cover 41 is slightly curved so that it has better strength for preventing from bending and can save material and cost of manufacturing. The holes 42 in the top cover 41 allow the water of waves to flow through the wave-elimination way 42 and escape from the bottom of the ship 11.

Figure 8:
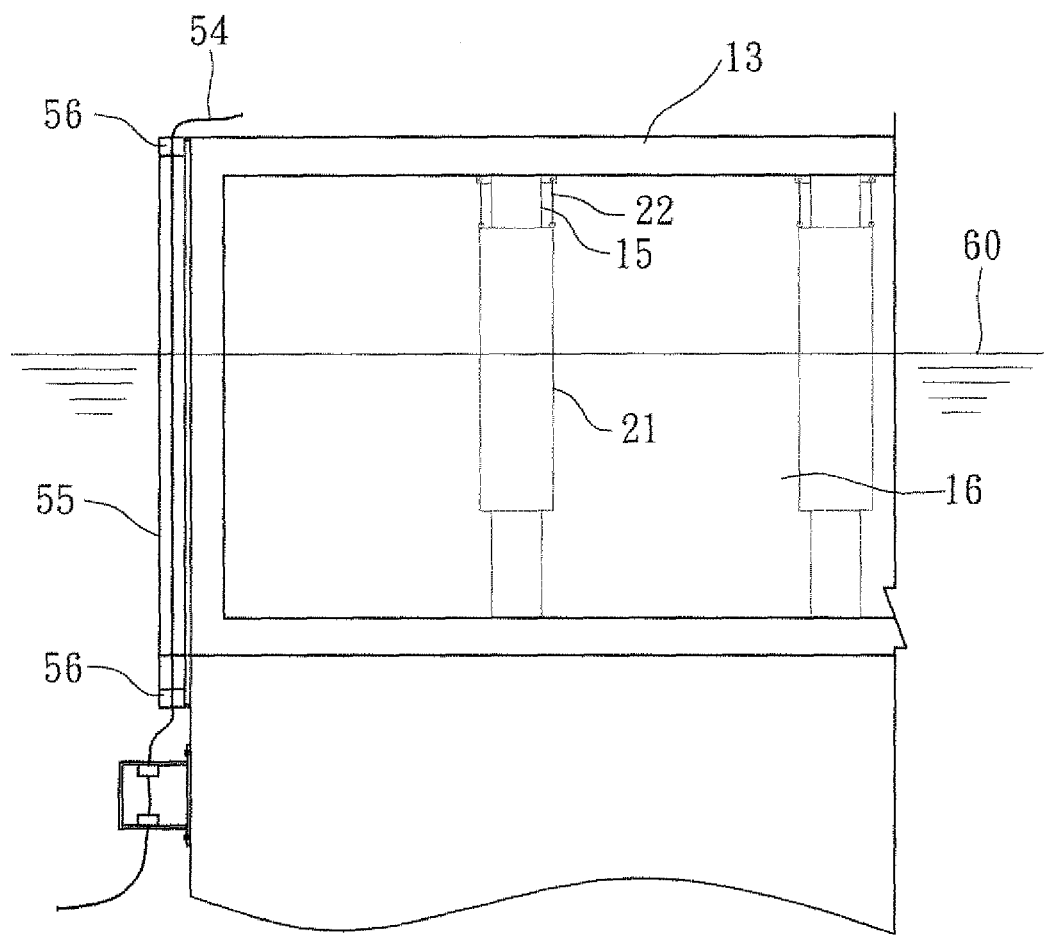
FIG. 8 shows that the ship is connected with a high-voltage cable.

As shown in FIG. 8, a high-voltage cable 54 is required to be connected between the ship 11 and the power factor on land, so that the high-voltage cable 54 is spread on the bottom of the sea and then goes through the sea level 60 to be connected to the power factor. In order to protect the high-voltage cable 54 from being affected by the waves on the sea level 60, the ship 11 includes a protection pipe 55 on outside thereof and the sea level 60 is located at a mediate portion of the protection pipe 55. A high-voltage cable 54 extends through the protection pipe 55, the high-voltage cable 54 is positioned by two positioning blocks 56 on two ends of the protection pipe 55.

The chambers 14 allow the ship to float on the higher position on the sea level 60 when the ship is in the port by removing the water out from the chambers 14. When the ship 11 is moved to desired position to proceed operation, the chambers 14 are filled with water to let the ship 11 to be half-merged in the water so as to reduce the affect by the waves.

The support tubes 15 are protected by the steel tubes 21 so that the waves cannot hit the support tubes 15 directly and the rubber tubes 17 can absorb forces from the waves to prevent the steel tubes 21 from hitting the support tubes 15 directly.

The rods 32 connect the annular connector 31 to the passage 23 so as to form a flexible connection for the transmission pipe 33 which can swing slightly to prevent from being damaged by the sea streams.

The hollow dampers 34 can absorb the force from different directions so that the transmission pipe 33 can be protected and the sealing between the passage 23 to the bottom opening 27.

The top cover 41 is slightly curved so that it has better strength for preventing from bending and can save material and cost of manufacturing. The holes 42 in the top cover 41 allow the water of sudden waves to flow through the wave-elimination way 42 and escape from the bottom of the ship 11.

The ship 11 includes the protection pipe 55 on outside thereof and the sea level 60 is located at a mediate portion of the protection pipe 55. The high-voltage cable 54 extends through the protection pipe 55 and is protected from being hit by the waves directly.

While we have shown and described the embodiment in accordance with the present invention, it should be clear to those skilled in the art that further embodiments may be made without departing from the scope of the present invention.

What is claimed is:

1. An ocean thermal energy conversion assembly comprising:

a ship having a lower part and a top deck, a plurality of chambers defined in the lower part, a plurality of support tubes connected between the lower part and the top deck so as to define an open space, at least one passage defined through the lower part and an annular connection portion connected to a top of the passage, an outlet pipe connected an inside of the at least one passage;

an annular connector located at a lower end of the at least one passage and a plurality of rods extending from a top of the annular connector, the rods pivotably connected to the annular connection portion, a transmission pipe connected to an underside of the annular connector, a hollow damper connected to an outer periphery of the annular connector and liquid received in the hollow damper, an outer periphery of the hollow damper engaged with an inner periphery of a bottom opening defined in a lower end of the passage, and;

a top cover engaged with and sealing a top opening of the passage, a wave-elimination way defined in an inside of the top cover and having a first end communicating with an outlet pipe on an outside of the passage, the wave-elimination way communicating with a plurality of holes defined in the top cover and the holes communicating with the wave-elimination way.

2. The system as claimed in claim 1, wherein a plurality of rubber tubes spirally warp around each of the support tubes an a plurality of sock absorbing members are located between the rubber tubes, each rubber tube is filled with a pressurized liquid so that a diameter of each shock absorbing members is smaller than a diameter of each of the rubber tubes, a steel tube is mounted to each of the support tube and hanged by steel cables, an inner periphery of the steel tube is in contact with the rubber tubes.

3. The system as claimed in claim 1, wherein the outlet pipe communicates with the top opening and a bottom of the ship.

4. The system as claimed in claim 3, wherein the holes in the top cover are adapted to allow the water of waves to flow through the wave-elimination way and escape from the bottom of the ship.

5. The system as claimed in claim 1, wherein the two shock absorbing collars are located on two ends of the hollow damper and an diameter of each shock absorbing collar is smaller than a diameter of the hollow damper.

6. The system as claimed in claim 1, wherein the ship merges into the water by filling water into the chambers until a sea level is located on a half height of the support tubes in the space.

7. The system as claimed in claim 1, wherein the ship includes honey-comb shaped flow ways defined in the lower part thereof and openings are defined in communication between the honeycomb shaped flow ways and outside of the lower part of the ship.

8. The system as claimed in claim 1, wherein the ship includes a protection pipe on outside thereof and the sea level is located at a mediate portion of the protection pipe, a high-voltage cable extends through the protection pipe, the high-voltage cable is positioned by two positioning blocks on two ends of the protection pipe.

* * * * *